Oct. 25, 1955     M. KRAMCSAK, JR     2,721,766

INDUSTRIAL TRUCK CASTER SKEIN

Filed Nov. 14, 1951     3 Sheets-Sheet 1

INVENTOR

M. Kramcsak, Jr.

BY Rockwell & Bartholow

ATTORNEYS

Oct. 25, 1955     M. KRAMCSAK, JR     2,721,766
INDUSTRIAL TRUCK CASTER SKEIN
Filed Nov. 14, 1951     3 Sheets-Sheet 2
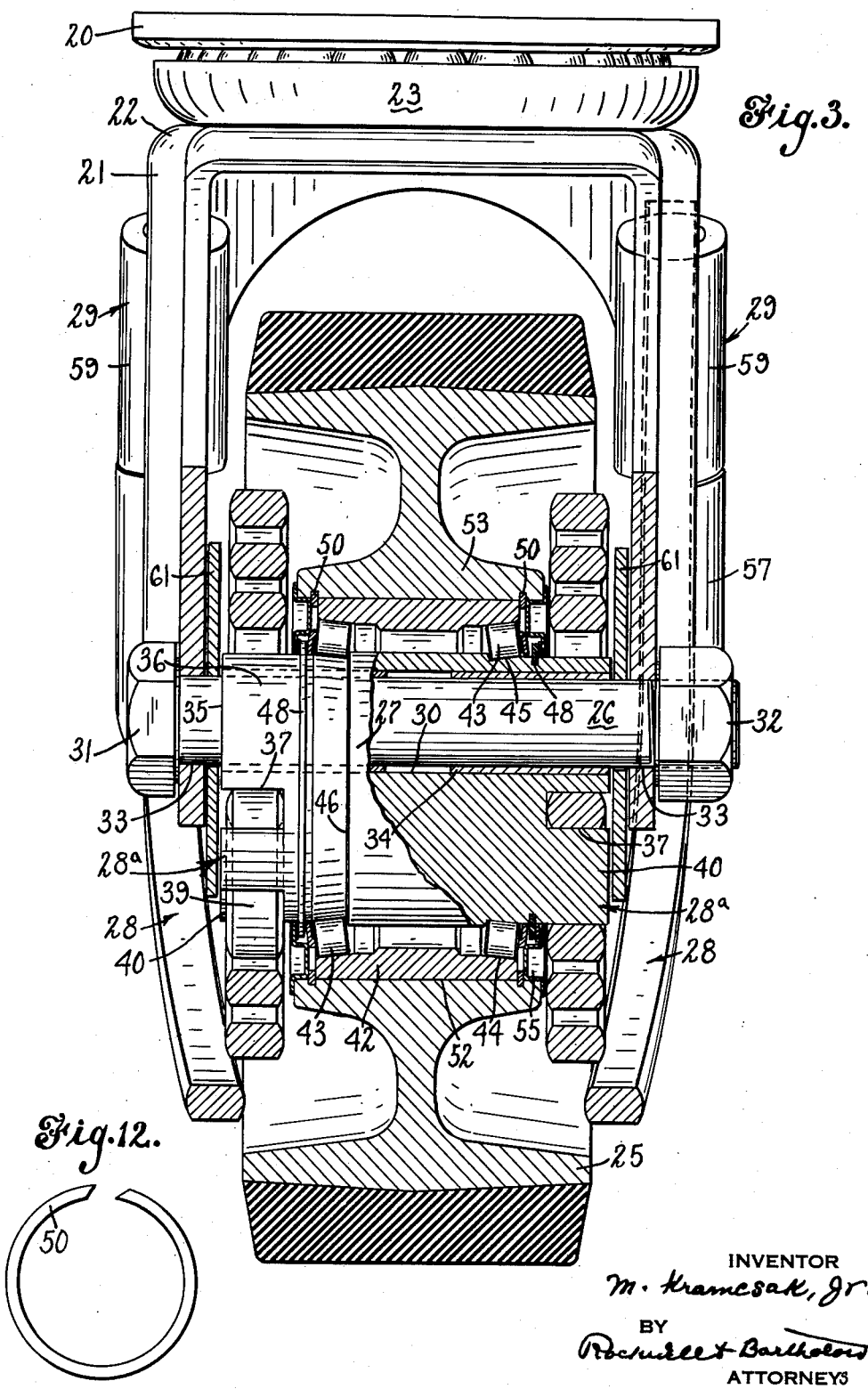
INVENTOR
M. Kramcsak, Jr.
BY
Rockwell & Bartholow
ATTORNEYS Oct. 25, 1955     M. KRAMCSAK, JR     2,721,766
INDUSTRIAL TRUCK CASTER SKEIN Filed Nov. 14, 1951     3 Sheets-Sheet 3

INVENTOR
M. Kramcsak, Jr.
BY
Rockwell & Bartholow
ATTORNEYS

United States Patent Office 2,721,766
Patented Oct. 25, 1955

2,721,766

INDUSTRIAL TRUCK CASTER SKEIN

Michael Kramcsak, Jr., Bridgeport, Conn., assignor to The Bassick Company, Bridgeport, Conn., a corporation of Connecticut Application November 14, 1951, Serial No. 256,224

4 Claims. (Cl. 301—133)

This invention relates to industrial truck casters, and more particularly to those of the type described in the Herold Patent 2,377,232, of May 29, 1945, also the Herold Patent 2,544,924, dated March 13, 1951.

In the first-mentioned patent there is disclosed, among other things, a caster or like wheeled support having a floating eccentrically mounted skein or hub under the control of a spiral spring, the arrangement being such that the caster wheel can ride or float over bumps or rough surfaces of floors or roads. The spiral spring is connected at one end to one end of the skein or hub, and the other end of the spring may be fastened to one of the legs of the caster horn.

Herold Patent 2,544,924 discloses an industrial truck caster in which a duplex and asymmetrical wheel structure is under the control of spiral springs connected to the respective ends of a skein. In detail, the means whereby the respective ends of the spring are fastened to the skein and to the horn leg differ from those disclosed in the earlier patent.

One object of the present invention is to improve and simplify casters or wheeled supports of the general type shown in these patents.

Another object is to provide for the easier and more convenient assembly of the caster parts, and more particularly the easier and more convenient installation of those parts which are placed on the axle in the caster horn.

A further purpose of the invention is to reduce the number of parts to a minimum and provide an assembly of unitary character which can be easily and conveniently assembled as a unit with reference to the wheel prior to the wheel being placed in the caster horn.

Another aim of the invention is to provide an improved form of connection between the inner end of the spring and the skein whereby the manufacture and assembly of the parts is made easier and more convenient.

Another object is to provide a reversible connection between the inner end of the spring and the ends of the skein.

Another object is to provide a caster or wheel mounting in which a cushioning spring is attachable to either end of the skein and wherein the device may be equipped with either one spring or two as may be desired.

In the accompanying drawings:

Fig. 3 is an enlarged section on line 3—3 of Fig. 1, with some parts in elevation;

Fig. 12 is a detail of one of the snap rings.

The swiveling structure in the caster selected for illustration is similar to that shown in Fig. 16 of Herold Patent 2,377,232, the caster being provided with an upper attaching plate adapted to be secured to the under part of the truck body or other object. The top of the caster horn has suitably fixed thereto a cup-shaped member between which and the under surface of the attaching plate antifriction balls are placed, the horn top and the attaching plate being interconnected by a swivel pin.

Figure 2:
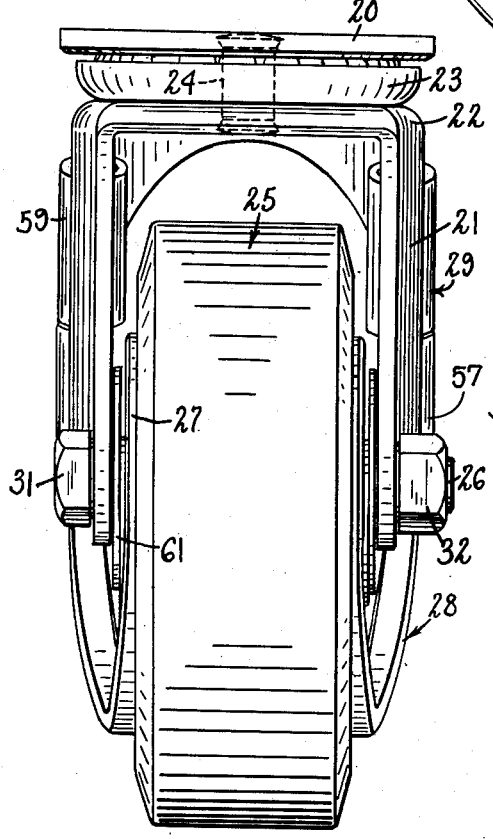
Fig. 2 is a front elevation of the caster.

In the drawings, the attaching plate is indicated at 20, the horn at 21, the horn top at 22, the upwardly facing cup member fixed to the horn, at 23, and the swivel pin at 24 (Fig. 2). The wheel is shown at 25, the axle at 26, and the skein at 27. The caster selected for illustration has two spiral springs 28, each being secured at one end to the corresponding end of the skein and at the other end to the upper part of the corresponding horn leg. The connection to the end of the skein is generally indicated at 28ª, and the connection to the upper end of the horn leg is generally indicated at 29. The specific features of these connections will be described hereinafter.

The axle 26 extends through an eccentric bore 30 in the skein, and the axle is provided at one end with a fixed head or enlargement 31 and at the opposite end with a threaded nut 32. The axle extends through perforations 33 in the horn legs near the lower extremities of the latter. The springs at their inner or lower ends are set into and interlocked with the end portions of the skein, as hereinafter described, and for the greater part of the pancake spiral spring lies in a plane intersecting the end portion of the skein. However, for purpose of making connection of the outer or upper end of the spring to the corresponding horn leg, the upper terminal portion of the spring is somewhat offset in a lateral direction, as shown in Herold Patent 2,544,924.

Figure 1:
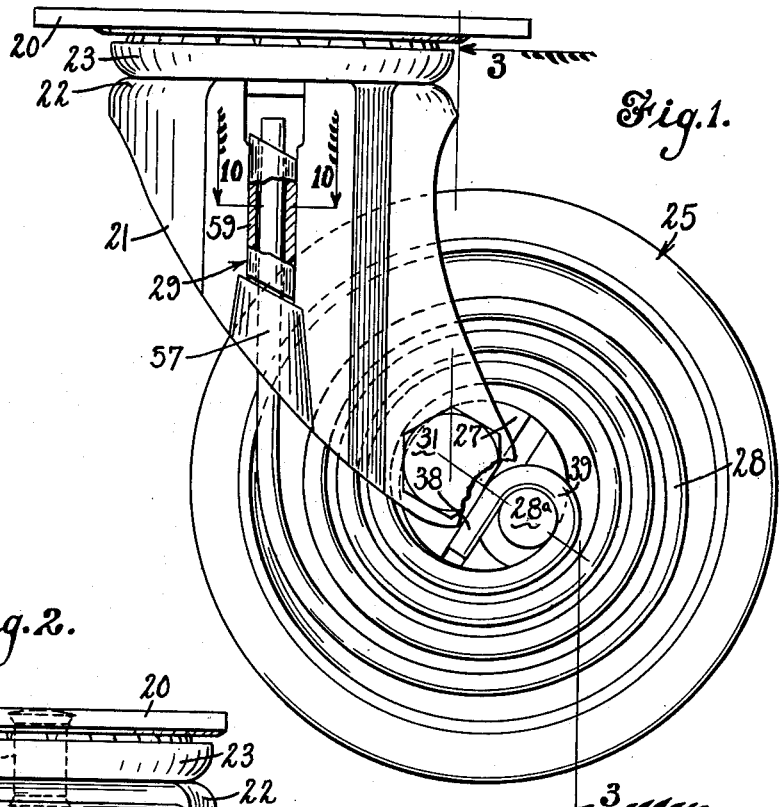
Fig. 1 is a side elevation, with certain parts broken away, of an industrial truck caster constructed in accordance with the invention.
Figure 5:
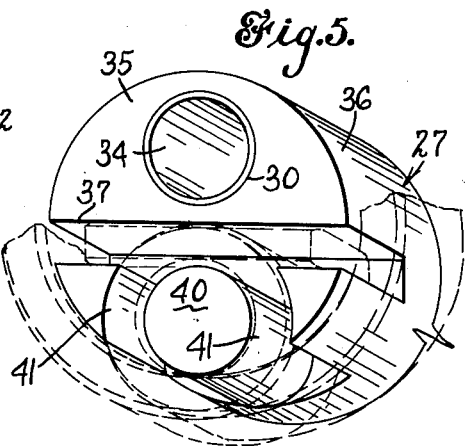
Fig. 5 is a perspective view of one end of the skein.

The skein 27 is preferably provided within the bore 30 with suitable fixed liners 34 which engage the cylindrical surface of the axle so as to provide a proper bearing for the skein in its turning movement with reference to the axle. The two ends of the skein are of identical structure in this form of the device, each having the configuration shown in Figs. 5 and 9. Here the skein has a planar end face 35, to which the bore 30 extends, and a cylindrical side face 36, this side face being adapted to have the spring assembled in partial engagement therewith in relationship shown in Fig. 1. Referring to Fig. 5, it will be noted that below the bore 30 the face 35 is provided with a diametrical groove 37 open at the ends and of a depth to receive a short straight portion 38 at the inner reversely turned or looped extremity of the spring. In addition to the extremity 38, the spring has as a part of its looped terminal a substantially semi-circular curved portion 39, which embraces a round pin-like member 40 formed integrally with the skein and having its free end face in the same plane as the end face 35 of the skein. The pin-like member 40 has at opposite sides thereof (Fig. 5) curved groove portions 41 running to the side face of the skein and also to the groove 37. The arrangement is such that, when the short end portion of the spring is engaged in the diametrical groove and the short semicircular portion 39 is engaged with the pin 40 in one of the side grooves 41, a short portion of the innermost turn of the spring will be engaged with the side face of the skein.

Figure 9:
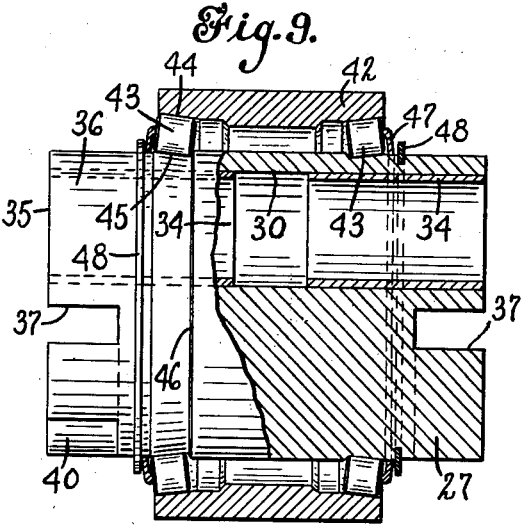
Fig. 9 is a transverse sectional view of the skein and roller bearing assembled to provide a unit ready for assembly with the wheel.
Figure 4:
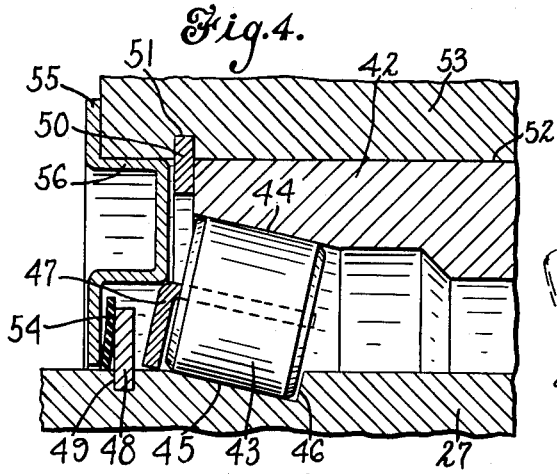
Fig. 4 is an enlarged fragmentary sectional view of certain parts shown in Fig. 3.

Referring to Figs. 3 and 9, the middle portion of the skein, that is, the portion between the end seats for the springs, is surrounded by an antifriction race member 42 with two series of antifriction members 43 intervening, each of these antifriction members being engaged with the antifriction race member and with a portion of the external surface of the skein. In the particular form shown, the antifriction members 43 are in the form of relatively short cylindrical rollers, there being one series of such rollers adjacent each end face of the race member. These cylindrical rollers 43 have their axes arranged at a slight inclination to the axis of the skein, and the arrangement is such that these cylindrical rollers take up end thrust as well as radial thrust. For this purpose the race member 42 is provided adjacent each end face with an inclined annular bearing surface 44 adapted to be engaged by the rollers of one series. Parallel to the surface 44 is another annular roller-engaging surface 45 which in this form is cut directly into the external surface of the skein. It will also be noted that in this form the cutting of the surface 45 at a slight angle provides at the inner side of said surface a limiting shoulder 46 for the rollers, which holds the rollers in their proper position laterally (Fig. 4). In connection with each series of rollers, a retainer or spacer, such as shown at 47, may be employed, which can be thrust into position from the end of the assembly (Fig. 4).

Externally of the roller bearing, it is preferred to set a snap ring 48 into an external annular groove 49 in the skein, at each end of the bearing, and it is preferred to assemble the assembly, shown in Fig. 9, with respect to the wheel 25 by the use of snap rings 50 set in annular grooves 51 in a bore 52 which extends through the hub portion 53 of the wheel. In the form shown, the hub portion of the wheel has a bore which closely fits the external surface of the race member 42, and the wheel is assembled with relation to the skein and the surrounding antifriction bearing structure by locating the ends of the race member so that they have the proper relationship to the grooves 51, and then snapping the rings 50 into place in the relationship shown in Fig. 4.

The assembly shown in Fig. 4 is completed by placing around the skein, and against the snap ring 48, a sealing washer or gasket 54 of rubberized fabric or like material, which closely engages the skein and is supported by the ring 48, a grease-retaining sheet metal member 55 then being applied to close in the end of the bearing. The member 55 is preferably in the form of a ring having a depressed annular portion 56, one side wall of which tightly fits against the inner surface of the bore in the wheel, so that this covering member, after being placed in position, will not readily be dislocated.

It will be apparent that the assembly of the skein with the antifriction bearing structure, shown in Fig. 9, will be held in position by the snap rings 48, which are snapped into the grooves in the skein at the respective sides of the antifriction bearing so as to be adjacent the roller retainers 47 and prevent lateral outward movement of the retainers and the rollers. The rollers being engaged with appropriately sloped roller-engaging surfaces of the race member 42, the race member under these conditions is held against axial displacement.

Figure 11:
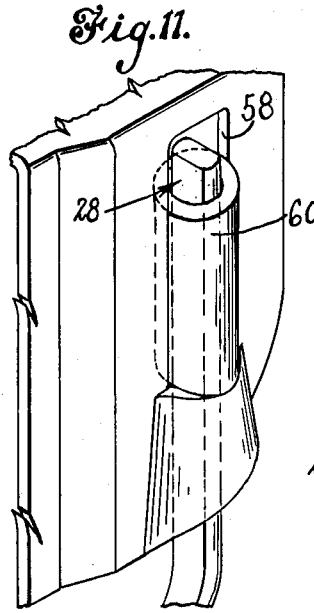
Fig. 11 is a fragmentary perspective view showing a modified form of the connection just mentioned.
Figure 10:
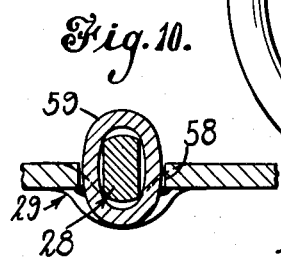
Fig. 10 is a section on line 10—10 of Fig. 1, showing a form of connection between the upper end of one of the springs and the corresponding horn leg.

In the form shown, the laterally displaced upper extremity of the spring, when placed in position with reference to the corresponding horn leg, lies substantially in the plane of the side wall of the leg, as shown in Fig. 10. In this case the side wall of the leg near the lower edge of the leg has an outwardly bowed portion 57, so that, as the upper end of the spring is moved upwardly for assembly, the side wall of the leg will be cleared, and above the bowed portion 57 there is an opening or cut-out 58 in the side wall accommodating a tubular member 59 which holds the spring terminal in position by enclosing it snugly. This tubular member 59 may be fixed in position with respect to the side wall of the horn in any suitable manner, as by welding it in place in the cut-out portion 58, as shown in the drawings. In the form illustrated, the tubular member 59 is somewhat flattened so as to present an elliptical section, as shown in Fig. 10, and in order that it may conform closely to the spring cross section, which in this case is an elongated cross section. However, if desired, a round tube portion 60 may be substituted for the tube portion 59, as shown in Fig. 11.

It will be understood that, for the assembly of the spring with respect to the end portion of the skein, all that is required is the relative axial movement of the two parts for the purpose of engaging the looped-back spring end (Fig. 1) with the recessed portion of the skein, as described above.

In the form shown, the wheel 25 is one having a heavy metal core with a wide central portion or hub and a wide rim, the rim having fixed thereto an elastic tread member or tire made of suitable composition and molded to the wheel body to provide an elastic solid tire. This particular wheel is, however, shown by way of example only.

In making the assembly of the caster as shown in Fig. 3, the procedure is first to assemble the antifriction bearing structure on the skein, as has been described above, and then assemble this structure with respect to the wheel, as has also been described. The next step is to place the springs in position on the ends of the skein, with the relatively straight upper extremities of the springs displaced laterally and outwardly. The next step is to move this assembly into position in the open horn so that the upper ends of the springs will move up into the sockets provided by the tubular members 59 or their equivalents. Then when the bore of the skein comes opposite the holes in the horn legs, shielding disks 61 will be placed in position over the ends of the skein and over the springs, and the axle 26 then inserted into the disk perforations and into the skein bore and the axle fastened in place. The disks 61 will substantially fill the spaces between the skein ends and the inner surfaces of the horn legs so that there will be no undesirable axial movement of the wheel. The springs will, of course, be effectively held in position in the skein ends, as the parts of the springs engaged in the diametrical grooves of the skein will substantially bottom in said grooves, and inasmuch as the disks which overlie the grooves prevent any objectionable axial movement of the springs in the opposite direction.

It will be seen from the foregoing that the process of assembly is very convenient and relatively simple, and produces a wheel mounting in which the bearing rollers take up end thrusts as well as radial thrusts. Obviously, also, the number of parts is reduced and the assemblage is expedited in comparison to structures such as shown in Herold Patent 2,487,134, where each series of rollers requires both an individual inner race member and an individual outer race member. It will also be apparent that the present structure is very advantageous because of the fact that the common outer race member employed is easily attachable to the wheel in a definite or predetermined axial setting or relationship, without the need of axial adjustment, and it is also advantageous that the bearing rollers have a predetermined axial setting with reference to the skein member without the need of axial adjustment. When desirable or necessary, the assembly shown in Fig. 4 can readily be dismounted by the withdrawal of the covering end ring, and by the removal on the one hand of the snap ring which positions the outer race member relatively to the wheel, and on the other hand the removal of the snap ring which positions the bearing relatively to the skein.

The connection of the lower end of the spring to the end of the skein permits very easy assemblage, as has been referred to above, and in the operation of the device the spring end is very effectively held in working position without possibility of disconnection or displacement.

The springs, being of the character previously mentioned, that is, having laterally offset upper end portions, must be made right-handed and left-handed, respectively, for a duplex spring arrangement such as herein described. The straight lower terminal portions 38 of the two springs both have the same direction, the groove 37 in one end of the skein being in line with that of the other skein end.

In the construction shown in Fig. 5, where the spring-end fastening means of the skein is of symmetrical formation, the spring may be located relatively to the skein in either of two positions, the terminal portion 38 being turned either to the right or to the left (Fig. 5). This simplifies the process of assembly. However, one spring having been placed in position relatively to the skein, the spring at the other end must be placed in a corresponding position.

Where the described skein-end structure is employed at both ends, the possibility exists of employing two springs or a single spring. If a single spring will not meet the existing load conditions, an extra spring may be used, and the connecting means for the lower end of the extra spring will be available. Where the caster is to take a single spring, and where, for example, only one kind of spring is available (right-hand or left-hand), this kind can be utilized by placing it at the proper end of the skein. In building such a single-spring caster, the only difference over the structure shown in the drawing would be the elimination of a spring at one side, the end-fastening means for the ends of an extra spring being present.

Figure 6:
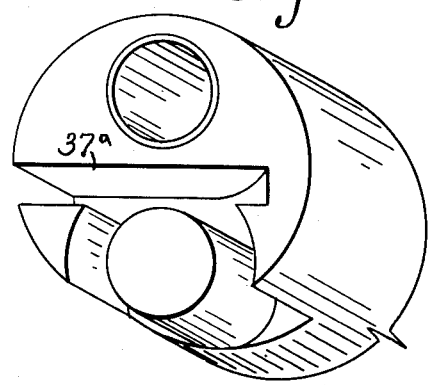
Fig. 6 is a view similar to Fig. 5 showing a modified form of skein.

In Fig. 6 I have shown an end construction for the skein which permits assembly of the spring in an irreversible relationship. Here the slot 37ª, usually formed by a milling tool, is not carried all the way across the end face of the skein. Except for these features the structure is as shown in Fig. 5.

Figure 7:
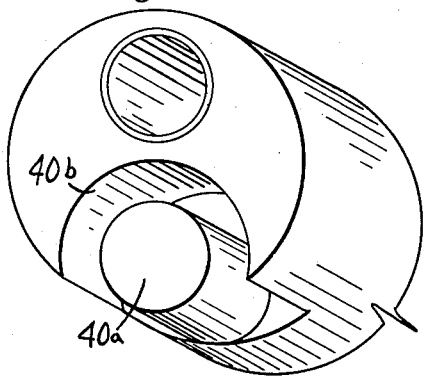
Figs. 7 and 8 are, respectively, a perspective view and an end elevation, showing a further modification of the skein end structure.
Figure 8:
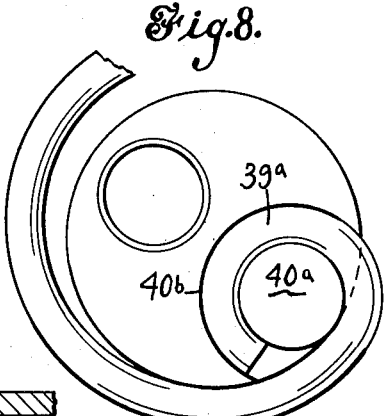

Figs. 7 and 8 show a further modified form of skein end structure. In this form the spring can be assembled in either of two relationships to the skein, as in the case of Fig. 5, the spring-end fastening being of symmetrical form. Here, however, the pin-like member 40ª, except for the part thereof which is in line with the side face of the skein, is surrounded by a groove 40ᵇ of partly circular or arcuate form. The end portion of the spring is shaped to conform to the curvature of this groove. In this particular form the end portion 39ª of the spring conforms to member 40ª over substantially three-fourths of a circle. As in the previous cases (Fig. 5 and 6), the pin member is diametrically aligned with the bore 30, and is placed so that at one side the pin is substantially in line with the circumference of the skein end. As shown in Fig. 8, a substantial part of the skein side face to the left of the member 40ª is contacted by the innermost turn of the spring, so as to provide a firm support for the spring, and this condition also exists in the other forms selected for illustration.

While several different forms of the device are shown in the drawings, it is to be understood that various other modifications and changes in the details may be adopted without departure from the principles of the invention and the scope of the claims. It is manifest that the invention is not limited to a caster or other wheeled support of the swiveling type.

What I claim is:

1. In a device such as described, a subassembly comprising a skein having an eccentric bore for support on an axle, and an antifriction bearing structure on the skein and secured thereto, the skein being provided with a pair of integral pin members disposed on the respective ends thereof and each adapted to be engaged in a looped spring terminal, said pin members being round and each having a part of the circumference thereof substantially flush with the skein circumference.

2. In a device such as described, a subassembly comprising a skein having an eccentric bore for mounting the skein on a supporting axle, and an antifriction bearing structure on the skein and secured thereto, the skein being provided with integral pin members at the respective ends thereof, each pin member being adapted to engage in a looped spring terminal, said pin members being round and each having a part of the circumference thereof substantially coincident with a part of the skein circumference, each pin member having its center on the same diameter as the skein bore and the skein being provided with a groove at each end thereof located circumferentially of the corresponding pin member for receiving the looped spring terminal.

3. In a device such as described, a skein having an eccentric bore for support on an axle and provided with an antifriction bearing element circumferentially thereof, the skein having similar planar ends each arcuately grooved to provide a round pin member having its center on the same diameter as the skein bore and having a part thereof substantially coincident with a part of the skein circumference, each pin member being adapted to be engaged in a looped spring terminal.

4. In a device such as described, a skein having an eccentric bore for support on an axle and provided with an antifriction bearing element circumferentially thereof, the skein being provided with similar planar ends each having an arcuate groove formed therein to provide a round pin member having its diameter on the same diameter as the skein bore and having a part thereof substantially coincident with a part of the skein circumference, each of said planar ends having a cross groove formed therein communicating with one of the arcuate grooves, each cross groove extending through the skein circumference and having open ends, each pin member being adapted to be engaged in a looped spring terminal exending into said arcuate groove and said cross groove.

References Cited in the file of this patent

UNITED STATES PATENTS

| | | |
|---|---|---|
| 1,169,652 | Kimberley | Jan. 25, 1916 |
| 1,415,694 | Perkins | May 9, 1922 |
| 2,377,232 | Herold | May 29, 1945 |
| 2,437,907 | Casper | Mar. 16, 1948 |
| 2,443,900 | Evans | June 22, 1948 |
| 2,506,278 | Ristow | May 2, 1950 |